United States Patent Office 3,789,024
Patented Jan. 29, 1974

3,789,024
REFORMING CATALYST
John W. Myers, Bartlesville, Okla., assignor to
Phillips Petroleum Company
No Drawing. Filed Oct. 18, 1971, Ser. No. 190,288
Int. Cl. B01j 11/08
U.S. Cl. 252—466 PT  3 Claims

ABSTRACT OF THE DISCLOSURE

An improved catalyst comprising a refractory support and platinum promoted with both iridium and gallium, exhibiting increased activity and selectivity characteristics for the dehydrocyclization and reforming of hydrocarbons is provided. In one embodiment, alumina promoted with platinum, iridium, and gallium, converted n-heptane to benzene and toluene with substantial conversion at high selectivity.

This invention relates to reforming hydrocarbons. In another aspect, this invention relates to platinum-type catalysts promoted with iridium and gallium. In yet another aspect this invention relates to the conversion of hydrocarbons using the improved catalyst.

Platinum-type catalysts have come into commercial use in the conversion of hydrocarbons. Catalysts containing platinum have been used commercially for the reforming of naphthas. A well-known disadvantage of such catalysts and reforming processes, however, is their tendency to lose activity after a period of use at elevated temperatures. This period of use is particularly short when the catalyst is subjected to periodic regeneration by oxidation to remove carbonaceous deposits formed during hydrocarbon conversion processing. Most catalytic reforming processes operate at high reaction pressures in order to control coke deposition and catalyst deactivation. When reforming at low pressures, conventional catalysts rapidly foul and become deactivated, thereby preventing the reforming processes from having long operational life. Extensive research has therefore been developed to lower pressures utilized in reforming processes and catalysts for the use therein since the low pressure processes result in substantial increases in yield of gasoline products of high rating.

The problem is to find an inexpensive catalyst system for dehydrocyclization and naphtha reforming which can be used at relatively low pressures and yet provide favorable reforming results and maintain long catalyst life. High temperatures could be used to overcome this deactivation problem but this would increase side reactions such as hydrocracking. The present invention provides an alternative catalyst which has an economic advantage over many of those known in the art.

Accordingly, an object of this invention is to provide an improved platinum-type catalyst. Another object of this invention is to increase the activity and selectivity of platinum-type catalysts for reforming. Yet another object of this invention is to provide an improved process for the reforming of naphthas. Other objects and aspects, as well as the several advantages of the invention, will be apparent to those skilled in the art upon reading the specification and the appended claims.

In accordance with the invention, refractory supported platinum-type catalysts are improved in activity and selectivity by incorporating therein a finite amount of iridium and gallium. Further in accordance with the invention, hydrocarbons are reformed by contacting with a supported platinum-type catalyst promoted with iridium and gallium which exhibits increased activity and selectivity for reforming reactions.

In accordance with a specific embodiment, alumina promoted with platinum, iridium, and gallium converts n-heptane to benzene and toluene at low pressure with substantially complete conversion and high selectivity of the paraffin to aromatics. The catalysts of the invention consist of a small but finite amount of each of the elements platinum, iridium and gallium incorporated into a refractory support such as alumina. The catalyst compositions of the invention can contain from about 0.01 to about 5 weight percent of each of platinum, iridium, and gallium with the remainder being a refractory support with the preferred amounts of the promoters being in the range of from about 0.05 to about 2 weight percent of each of platinum, iridium, and gallium with the remainder being a refractory support such as alumina. Other support material can be selected from silica, zinc spinel, titania, charcoal, thoria, zirconia, pumice, kieselguhr, magnesia, silica-alumina with titania, silica-magnesia, and the like. Although other materials can be used as support, alumina, including both the gamma-alumina and the eta-alumina, is preferred.

Any conventional and convenient catalyst preparation mode can be used for preparing the catalysts of this invention. Impregnation of a suitable catalytic alumina is preferred. A choice of readily available soluble platinum, iridium, and gallium compounds is generally limited, and compounds such as the halides or the chloroacids, are generally used. After impregnation, the compositions are suitably dried and then activated by elevated temperatures, for example, 600–1200° F., preferably 800–1000° F., in air, hydrogen, or inert gases. If desired, the catalyst can be further promoted for reforming applications through the addition of halogens to the feed stream or to the catalyst.

The catalysts of the invention are especially effective in the reactions involved in naphtha reforming including hydrogenation, dehydrocyclization, isomerization, and hydrogenation, and have exhibited increased activity and selectivity for the conversion, for example, of paraffins to aromatics. The catalysts of the invention are particularly applicable to the dehydrocyclization and reforming of hydrocarbons including acyclic and cyclic paraffins, particularly naphthenes and paraffins. The catalysts are particularly suitable for the reformation of paraffins containing from 6 or more carbon atoms per molecule including n-hexane, methyl hexane, n-heptane, dodecane, and the like. Some examples of the naphthenes which can be reformed with the catalysts are methylcyclopentane, cyclohexane, and the like. Some olefins can be present in the feedstock. The preferred feeds range from the $C_6$ to $C_{12}$ paraffins and $C_6$ to $C_{12}$ naphthenes. The catalysts can be employed for the reformation of mixtures of paraffins and naphthenes such as are obtained from the distillation of straight run or natural gasolines. Most often, refinery streams containing such materials and boiling in the range of from about 150–400° F. are used. Low sulfur containing feeds are generally preferred.

In utilizing the catalysts of this invention for the dehydrocyclization reforming of the foregoing hydrocarbons, the hydrocarbons to be reformed are contacted with the catalysts of the invention at a temperature, pressure, and flow rate of hydrocarbon feedstock in the presence of hydrogen to convert the hydrocarbon feedstock to the desired reformed product. The conditions employed will vary appreciably depending upon the hydrocarbon feedstock used. Generally, the temperature employed will be in the range of 600–1100° F., preferably 700–1050° F., in the presence of hydrogen. The hydrogen rate during reforming will ordinarily range from 0.5 to 20 mols of hydrogen per mol of hydrocarbon. The temperature to be employed in the reforming process will be determined largely by other operating conditions, that is, at a particular pressure, liquid hourly space velocity, and hydrogen-to-hydrocarbon ratio. The temperature utilized is normally determined by the desired octane number of the product to be produced, for example, higher octane numbers are achieved at higher temperatures within the operational limits set forth above.

The pressure in the reforming reaction zone for the purposes of the present invention is generally less than 600 p.s.i.g. Preferably, the pressure will be at least 100 p.s.i.g. but less than 400 p.s.i.g. The hydrocarbon feed rate for use in the present invention, i.e., the liquid hourly space velocity (LHSV) is in the range of 0.2 to 10, preferably 0.5 to 5 LHSV.

In utilizing the catalysts of the invention for reforming hydrocarbons, the reforming reaction can be carried out either batchwise or continuously, preferably the latter. In carrying out the process as a continuous one, it is to be understood that hydrogen and the effluent product can be separated and recycled. Although the catalyst is relatively long lasting, occasional regeneration is required. The regeneration is carried out conveniently by first burning off carbon with a gas containing a low oxygen concentration and then repeating the activation procedure described above.

The following specific examples are intended to illustrate the advantages of the above-described catalyst of the invention.

EXAMPLE

Several catalysts were prepared by impregnating 12-20 mesh eta-alumina with appropriate solution concentrations of chloroplatinic acid, gallium nitrate and iridium tetrachloride which yield final desired catalyst compositions. In those instances where more than one promoter was deposited on the alumina, a single solution containing all of the impregnants was used.

After impregnation each of the catalysts was dried at about 240° F., then calcined at 800° F. in air for 2 hours. The catalysts were then charged into a fixed bed reactor and contacted with hydrogen at 900° F. before being put on stream with the feed hydrocarbon.

Each of the catalysts was subjected to a reaction sequence in which its activity and selectivity for the conversion of n-heptane to benzene plus toluene was determined over a long period of catalyst aging. The sequence consisted of a number of cycles, each about 22 hours long. For most of the cycle the temperature of the reaction zone was maintained at about 925° F. except for a four-hour period at 895° F. and another four-hour period at 950° F. The reactor effluent was sampled during each of these latter two temperature periods and the samples were analyzed to show extent of conversion and selectivity to aromatic products. The results of the last of such samplings, at a given number of hours on stream, are shown for each of the invention catalysts and for each of the comparison catalysts. These results are shown in Table I below.

TABLE I
Dehydrocyclization of n-heptane [1]

| Run | Promoter, wt. percent | 895° F. | | | 950° F. | | |
|---|---|---|---|---|---|---|---|
| | | Catalyst age, hrs. | Conversion | Selectivity [2] | Catalyst age, hrs. | Conversion | Selectivity [2] |
| 1 | 0.5 Pt | 103 | 62.5 | 48.1 | 108 | 95.4 | 54.2 |
| 2 | 0.5 Pt, 0.3 Ga | 94 | 67.3 | 35.6 | 99 | 95.9 | 42.0 |
| 3 | 0.5 Pt, 0.5 Ga | 82 | 87.3 | 30.4 | 87 | 100 | 41.4 |
| 4 | 0.5 Pt, 0.3 Ir | 94 | 72.8 | 50.4 | 99 | 98.6 | 56.4 |
| 5 | 0.5 Pt, 0.3 Ir, 0.3 Ga | 103 | 89.7 | 46.6 | 108 | 100 | 55.6 |

[1] At 100 p.s.i.g., 1.5 n-heptane LHSV, 7:1 $H_2$: heptane mol ratio.
[2] Selectivity to benzene and toluene.

Table I above demonstrates through the comparison of runs 2, 3 and 4 that the presence of gallium, like iridium, on a platinum-alumina catalyst substantially improves the conversion rate. However, it is further found that the presence of some iridium rather than gallium results in a better selectivity. Inventive run 5, when compared to the platinum-promoted run 1, the platinum-gallium-promoted runs 2 and 3, and the platinum-iridium run 4, illustrates the resulting high conversion and satisfactory selectivity when using a platinum-, iridium-, gallium-promoted catalyst.

Certain modifications of the invention will become apparent to those skilled in the art and the illustrated details disclosed are not to be construed as imposing unnecessary limitations on the invention.

What I claim is:

1. A catalyst composition comprising; 0.01-5 weight percent platinum, 0.01-5 weight percent iridium, and 0.01-5 weight percent gallium, incorporated into a refractory support.

2. A composition according to claim 1 wherein the refractory support is alumina.

3. A composition according to claim 2 wherein the alumina support is impregnated with 0.05-2 weight percent platinum, 0.05-2 weight percent iridium, and 0.05-2 weight percent gallium.

References Cited
UNITED STATES PATENTS 3,507,781  4/1970  Spurlock et al. ___ 252—466 PT
2,814,599  11/1950  Lefrancois et al. _ 252—466 PT DANIEL E. WYMAN, Primary Examiner W. J. SHINE, Assistant Examiner U.S. Cl. X.R.

208—138